June 5, 1928.

G. A. PRIMROSE 1,672,085

SIGNAL

Filed March 27, 1922

Inventor

GEORGE A. PRIMROSE

Harry C. Schroeder
Attorney

June 5, 1928.  
G. A. PRIMROSE  
1,672,085  
SIGNAL  
Filed March 27, 1922  
2 Sheets-Sheet 2

Inventor  
GEORGE A. PRIMROSE  
By Harry C. Schroeder  
Attorney

Patented June 5, 1928.

1,672,085

UNITED STATES PATENT OFFICE.

GEORGE A. PRIMROSE, OF OAKLAND, CALIFORNIA.

SIGNAL.

Application filed March 27, 1922. Serial No. 547,087.

My invention is an improved automatic electric signal which is immediate in its action and efficient in its general operation.

Referring to the drawing forming part of this specification:

Figure 2 is a longitudinal section of the signal controlling mechanism and an elevation of the signal indicator connected electrically to said controlling mechanism.

Figure 1:
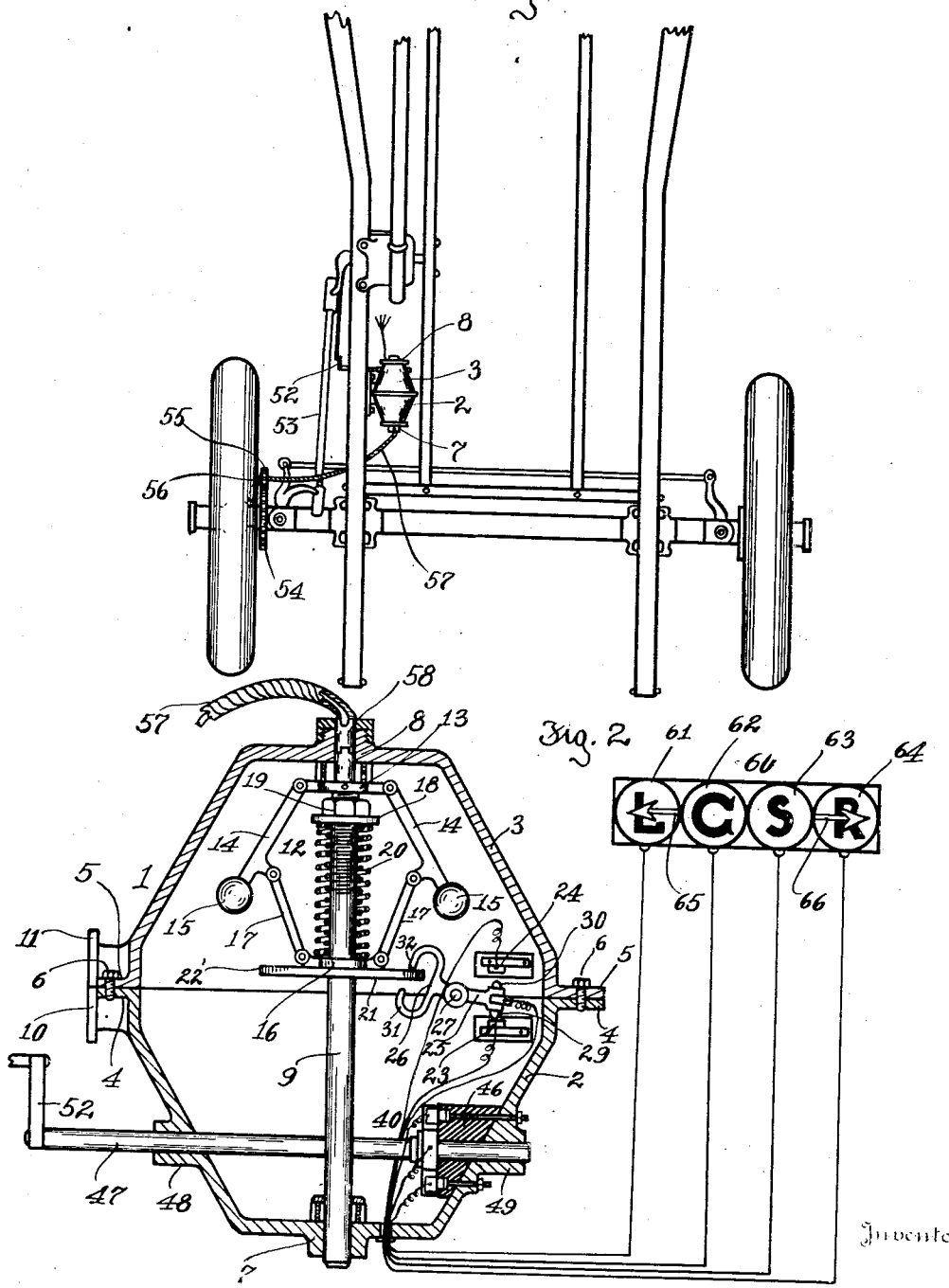
Figure 1 is a plan view of the front wheels and axle and the front portion of an automobile chassis with my signal mounted thereon.
Figure 3:
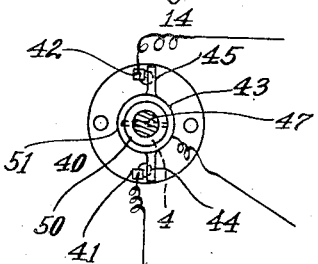
Figure 3 is a front view of the switch which controls the right and left signals.
Figure 4:
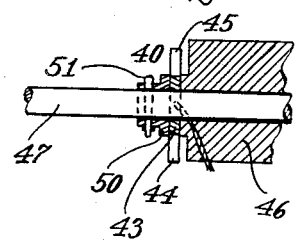
Figure 4 is a sectional view of said switch taken on line 4—4 of Figure 3.
Figure 5:
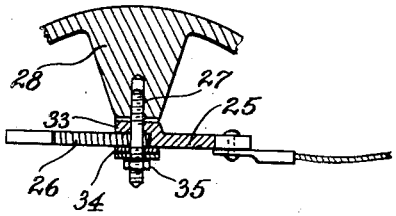
Figure 5 is a sectional view of the switch which controls the go and stop signals.

In the drawing 1 indicates a casing made in two conical sections 2 and 3 formed respectively with external flanges 4 and 5 at their bases which are bolted together by bolts 6. Bearings 7 and 8 are formed in the ends of the sections 2 and 3 respectively in which bearings is journaled a shaft 9 extending longitudinally through said casing. Flanges 10 and 11 extend at right angles from the flanges 4 and 5, which flanges 10 and 11 are bolted to the inside of the automobile chassis whereby the casing 1 is mounted on the chassis. On the shaft 9 inside the casing 1 is mounted a fly ball governor 12 including a collar 13 secured on said shaft; a pair of ball arms 14 pivoted to said collar; weighted balls 15 secured to the ends of said arms; a collar 16 slidable on said shaft; a pair of links 17 connected to arms 14 and collar 16; a collar 18 on said shaft; a nut 19 screwing on said shaft against said collar; and a spring 20 surrounding said shaft and bearing at its ends against collars 16 and 18 respectively. A collar 21 has an external annular flange 22'.

A go and stop switch 22 is mounted in the casing 1, which switch is operated by the governor 12 and comprises a pair of terminal contacts 23 and 24, a contact arm 25 and an operating arm 26 which arms are pivoted on a pin 27 secured into an embossment 28 in the casing 1. On the arm 25 are two contacts 29 and 30 for respectively engaging the contacts 23 and 24. On the arm 26 are formed a pair of curved fingers 31 and 32 between which extends the flange 22'. The arm 25 is formed with an offset 33 through which extends the pivot pin 27 and against which engages the pivoted end of the arm 26, in alignment with the arm 25. Fibre washers 34 fit on the pin 27 against the arms 25 and 26 and a nut 35 screws on the end of said pin against said washers, whereby the arm 25 may be moved by the arm 26 until the contact 29 or 30 engages the contact 23 or 24, whereupon the arm 26 may be moved up or down independently of the arm 25 by the flange 22.

A right and left switch 40 includes a pair of terminal contacts 41 and 42 and a switch arm member 43 formed with a pair of contact arms 44 and 45. The contacts 41 and 42 are mounted on a block of insulation 46 in the casing section 2 and the arm member 43 is frictionally mounted adjacent the insulation block 46 on a shaft 47 extending transversely through the casing section 2 and said insulation block and journaled in bearings 48 and 49 in said section. A collar 50 is pinned to the shaft 47 by a pin 51 to hold the switch arm member 43 adjacent the insulation block 45. A crank 52 is secured on the outer end of the shaft 47, which crank is connected to the drag link 53 of the automobile steering gear. A gear 54 is secured to the inside of one of the front wheels of the automobile with which gear meshes a pinion 55 journaled on a bracket 56 mounted on the front axle of the automobile. A flexible shaft 57 is connected at one end to the journal of pinion 55 and is coupled at its other end by a coupling 58 to the forward end of the shaft 9.

On the rear of the automobile is mounted a signal lamp casing 60 in the rear wall of which are glass panels 61, 62, 63 and 64 on which are the letters L, G, S and R and on the panels 61 and 64 are arrows 65 and 66 pointing to the left and right respectively. In the casing 60 back of the panels 61, 62, 63 and 64 are incandescent lamps 65', 66', 67 and 68 respectively.

Figure 6:
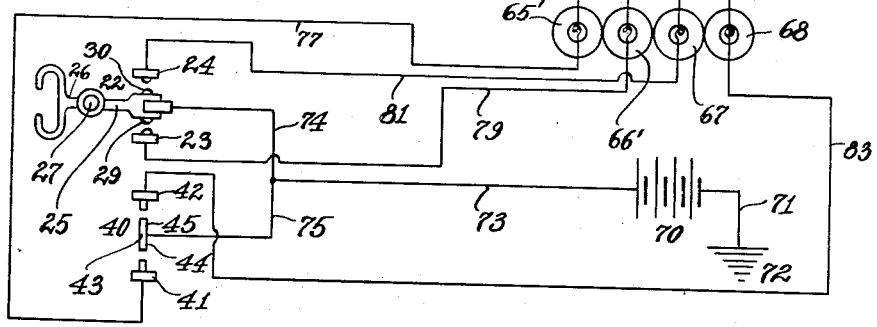
Figure 6 is a diagram of the signal electric circuit.

The signal circuit shown in Figure 6 will now be described. To one pole of a generator 70 is connected a lead 71 which is grounded at 72. The other pole of said battery is connected to a lead 73 which connects to leads 74 and 75 which in turn connect to switch contact arm 30 and switch arm member 43 respectively. One terminal of signal lamp 65' is grounded at 76 while the other terminal of said lamp is connected to a lead 77 which in turn connects to switch contact 41. One terminal of lamp 66' is grounded at 78 and the other terminal thereof is connected to a lead 79 which connects to switch contact 23. One terminal of lamp 67 is grounded at 80 while the other terminal of said lamp is connected to a lead 81 which in turn connects to the switch contact 24. One terminal of lamp 68 is grounded at 82 while its other terminal is connected to a lead 83 which in turn connects to switch contact 42.

When the automobile is running, the shaft 9 and governor 12 are rotated through the medium of gear 54, pinion 55 and flexible shaft 57, and the governor flange 21 raises switch arm 26 and lowers arm 25 until contact 29 engages contact 23 and closes the circuit of lamp 66' which shows the signal Go. When the automobile slows down the governor flange 21 swings arm 26 down and arm 25 up until contact 30 engages contact 24 and closes the circuit of lamp 67 which shows the signal Stop. When the automobile turns to the right the drag link 53 turns the crank 52 and shaft 47 and swings the switch arm 45 into engagement with contact 42 which closes the circuit of lamp 68 and shows the signal Right. When the automobile turns to the left the switch arm 44 is swung into contact with contact 41 through the medium of drag link 53, crank 52 and shaft 47, whereupon the circuit of lamp 65' is closed and the signal Left is shown.

Having described my invention, I claim:

In a signaling device for a motor vehicle having a wheel supported front axle, longitudinal frame members supported thereabove, and a steering mechanism including a longitudinally movable drag link associated with the front axle; a casing fixed to one of the frame members having a shaft extending longitudinally therethrough and having a driving connection with one of the wheels, a switch within the casing operated by said shaft in accordance with the speed thereof, a second shaft arranged in the casing transversely to the first shaft and connected to said drag link, and a second switch operated thereby.

In testimony whereof I affix my signature

GEORGE A. PRIMROSE